(12) United States Patent
Gray et al.

(10) Patent No.: US 7,441,818 B2
(45) Date of Patent: Oct. 28, 2008

(54) REMOVABLE VEHICLE SEAT COWL

(75) Inventors: Gary C Gray, Luck, WI (US); Brian R Koesters, Lindstrom, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 11/635,094

(22) Filed: Dec. 7, 2006

(65) Prior Publication Data

US 2007/0085366 A1    Apr. 19, 2007

Related U.S. Application Data

(62) Division of application No. 11/083,299, filed on Mar. 17, 2005, now Pat. No. 7,175,222.

(51) Int. Cl.
*B60R 19/42* (2006.01)
(52) U.S. Cl. .......................... 293/128; 296/69
(58) Field of Classification Search ............. 293/128; 296/63, 65.03, 69, 78.1, 180.1, 85
See application file for complete search history.

(56) References Cited

U.S. PATENT DOCUMENTS

| | | | |
|---|---|---|---|
| 5,080,431 A | 1/1992 | Frazier | |
| 5,658,035 A | 8/1997 | Armstrong | |
| 5,662,377 A * | 9/1997 | Holdampf et al. | 297/238 |
| 5,732,965 A | 3/1998 | Willey | |
| 5,741,046 A * | 4/1998 | Leuchtmann et al. | 296/65.09 |
| 5,829,833 A * | 11/1998 | Handa et al. | 297/238 |
| 5,853,217 A | 12/1998 | Armstrong | |
| 6,012,770 A | 1/2000 | Rubin | |
| 6,102,463 A * | 8/2000 | Swanson et al. | 296/69 |
| 6,113,172 A * | 9/2000 | Chaloult et al. | 296/26.08 |
| 6,176,538 B1 | 1/2001 | Lawson et al. | |
| 6,253,977 B1 | 7/2001 | Greger et al. | |
| 6,254,166 B1 | 7/2001 | Willey | |
| 6,293,603 B1 * | 9/2001 | Waku et al. | 296/69 |
| 6,338,516 B1 * | 1/2002 | Toyota et al. | 296/64 |
| 6,343,827 B1 | 2/2002 | Nepper, Sr. | |
| 6,505,877 B1 | 1/2003 | Devlin et al. | |
| 6,647,121 B2 | 11/2003 | Stanberry et al. | |
| 6,648,395 B2 * | 11/2003 | Hoshino | 296/69 |
| 6,679,537 B1 | 1/2004 | Putnam, Jr. | |
| 6,685,269 B1 * | 2/2004 | Freijy et al. | 297/332 |
| 6,736,441 B1 | 5/2004 | Barber et al. | |
| 6,808,219 B2 | 10/2004 | Barber et al. | |
| 6,820,756 B2 | 11/2004 | Garza | |
| 6,877,788 B2 | 4/2005 | Graham | |
| 6,908,137 B2 * | 6/2005 | Doxey et al. | 296/65.16 |
| 2002/0153462 A1 | 10/2002 | Donahue | |
| 2003/0052031 A1 | 3/2003 | Poore | |
| 2006/0001305 A1 * | 1/2006 | Christopher et al. | 297/331 |

* cited by examiner

*Primary Examiner*—Kiran B. Patel
(74) *Attorney, Agent, or Firm*—Baker & Daniels LLP

(57) ABSTRACT

A removable vehicle component, such as a seat cowl, including a body configured to couple to a vehicle in a first position wherein the body covers a portion of a seat of the vehicle and in a second position, such as connected to the vehicle windshield, wherein the body does not cover the portion of the seat.

7 Claims, 6 Drawing Sheets

US 7,441,818 B2

REMOVABLE VEHICLE SEAT COWL

This application is a divisional application of U.S. application Ser. No. 11/083,299, entitled REMOVABLE VEHICLE SEAT COWL, filed on Mar. 17, 2005, the entire contents of which are expressly incorporated herein by reference.

FIELD OF THE INVENTION

The present invention generally relates to removable vehicle components, and more particularly to a removable vehicle component configured to couple to the vehicle in a first position wherein the component covers a portion of the vehicle and in a second position wherein the component does not cover that portion of the vehicle.

BACKGROUND OF THE INVENTION

Motorcycles and other similar vehicles may include removable seat covers or seat cowls that cover a portion of the vehicle seat when attached to the vehicle. Such seat cowls may be used to cover a passenger portion of the seat when a passenger is not riding the vehicle, thereby improving the styling and aerodynamics of the vehicle. When a passenger desires to ride the vehicle, the seat cowl is removed.

Vehicle owners typically store the seat cowl temporarily in a garage either on the floor or on a table or bench. Such temporary storage locations, however, are undesirable as the seat cowl is exposed to scratching or other damage by falling or coming into contact with other objects.

Additionally, if the vehicle owner picks up a passenger at a location without convenient temporary storage, such as at an airport, bus stop or other location, the seat cowl must be strapped to the vehicle or carried by the passenger. If the seat cowl is strapped to the vehicle, it may vibrate and distract the driver or damage the vehicle. Additionally, the seat cowl may become dislodged while the vehicle is moving. This could cause damage to the seat cowl and present a hazard to other motorists. Similarly, if the seat cowl is carried by the passenger, the passenger's ability to hold safely onto the vehicle or the driver is impaired, and the passenger may drop the seat cowl causing damage and presenting a hazard to others.

Some conventional designs equip the seat cowl with an attached set of straps to permit the passenger to wear the seat cowl like a back pack while riding the vehicle. These designs are undesirable in that wearing a portion of the vehicle may be considered unattractive, uncomfortable, or otherwise undesirable.

SUMMARY OF THE INVENTION

The present invention provides a removable vehicle component, such as a seat cowl, having a body configured to couple to the vehicle in a first position wherein the body covers a portion of the vehicle seat, and in a second position wherein the body does not cover the portion of the seat. In one embodiment of the invention, the second position is on the front side of the vehicle windshield.

The above mentioned and other features of this invention, and the manner of attaining them, will become more apparent and the invention itself will be better understood by reference to the following description of embodiments of the invention taken in conjunction with the accompanying drawings.

Figure 1:
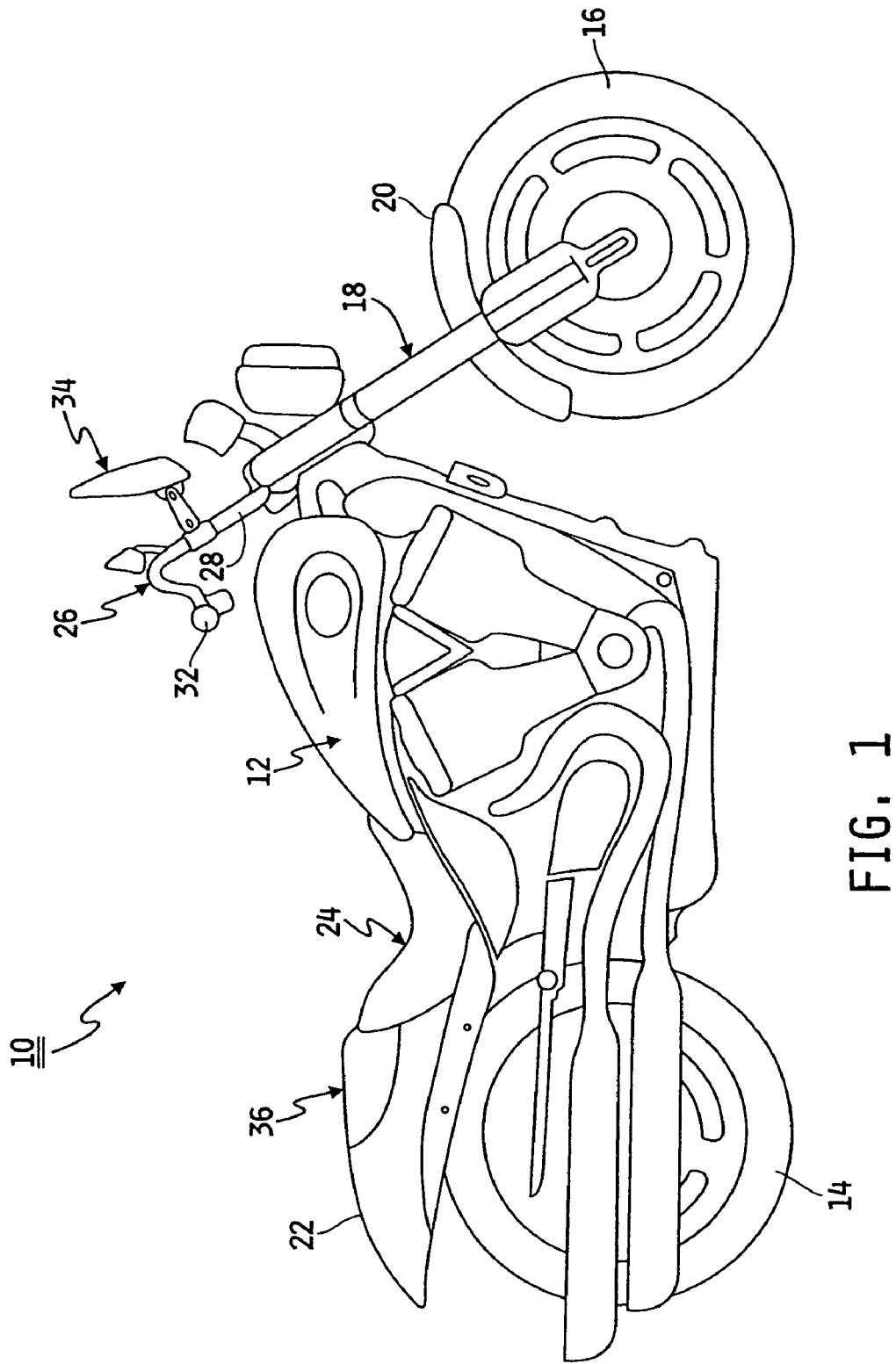
FIG. 1 is a side elevation view of a vehicle having a removable vehicle component according to one embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF EMBODIMENTS OF THE INVENTION

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to a seat cowl as the removable component of the invention, it should be understood that the principles of the invention apply equally to other removable vehicle components such as luggage racks. Additionally, the vehicle of the following description is a motorcycle. It should be understood, however, that the invention may have application to other types of vehicles such as all-terrain vehicles, snow mobiles, watercraft, utility vehicles, scooters, and mopeds.

Referring now to FIG. 1, a vehicle 10 including a removable component according to one embodiment of the present invention generally includes a chassis 12 and a pair of wheels 14, 16 mounted to chassis 12. Chassis 12 includes, among other things, a front fork 18 connected to wheel 16, a front fender 20 attached to fork 18, a rear fender 22, and a seat 24. Handlebars 26 are attached to fork 18 and include a pair of uprights 28, 30 (only upright 28 is shown) and a pair of grips 32, 34 (only grip 32 is shown) attached at the ends of uprights 28, 30. As will be further described below, a windshield 34 is attached to uprights 28, 30. Finally, as is also shown in FIG. 1, vehicle 10 includes a seat cowl 36 removably coupled to seat 24 such that seat cowl 36 substantially follows the contours of rear fender 22.

Figure 2:
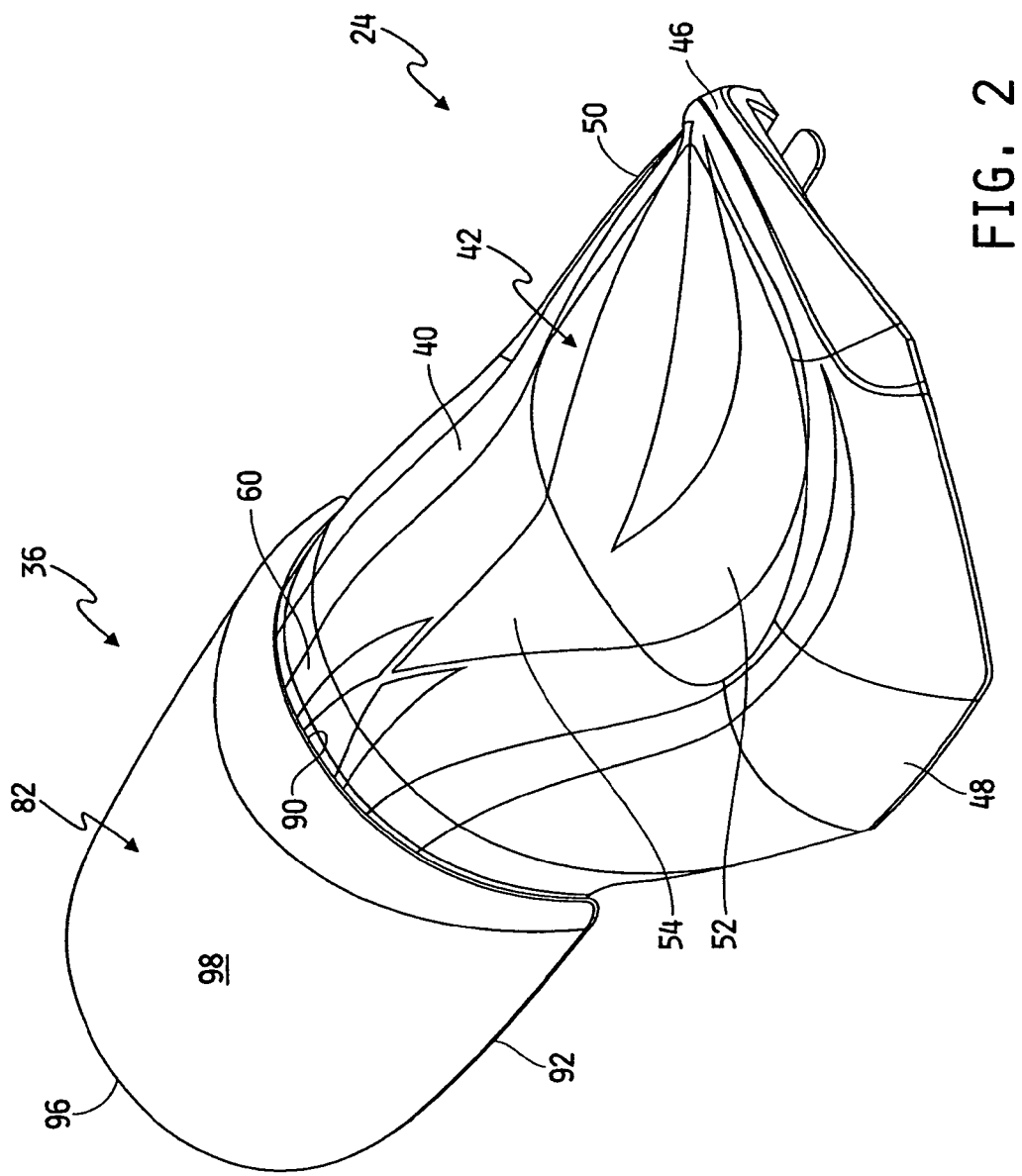
FIG. 2 is a perspective view of a vehicle seat, depicting a removable seat cowl attached to the seat.
Figure 3:
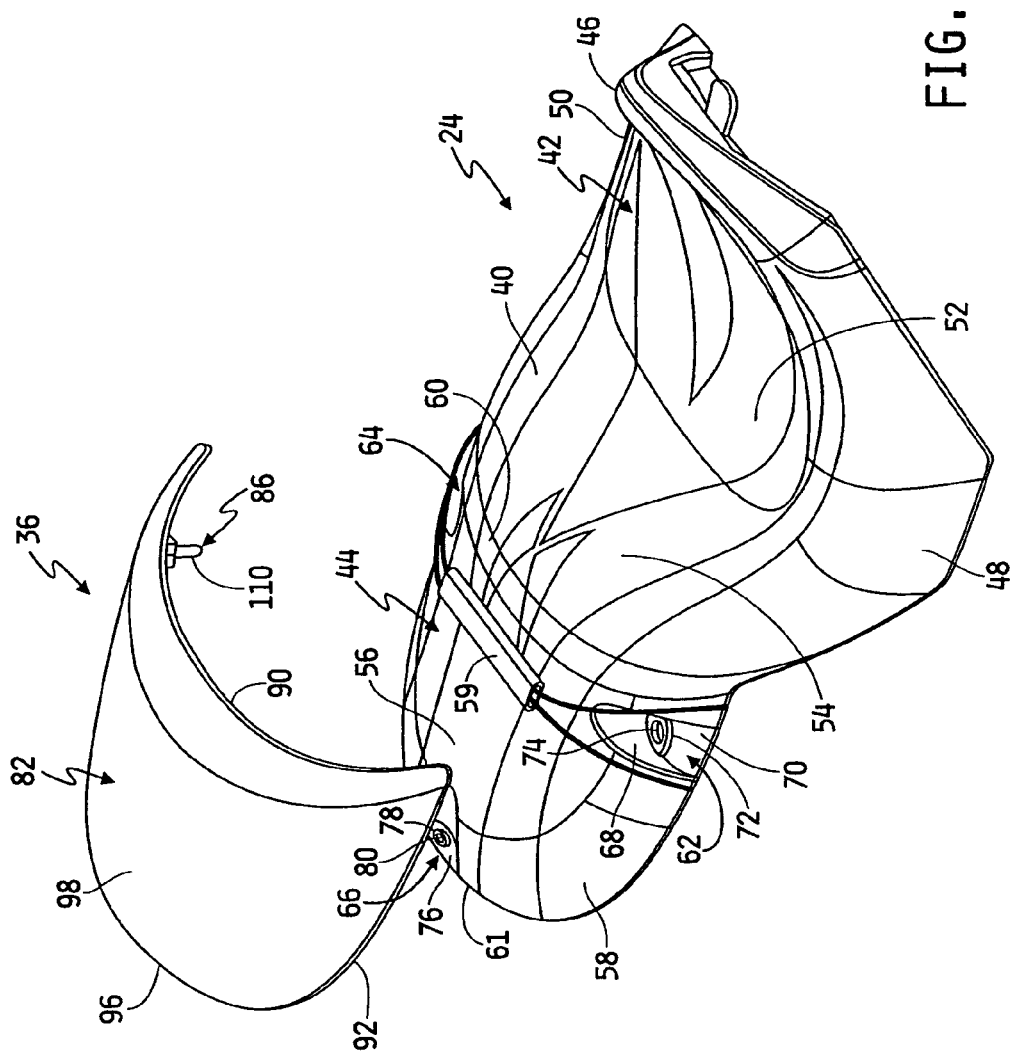
FIGS. 3 and 4 are perspective views similar to FIG. 2, depicting the seat cowl removed from the seat.
Figure 4:
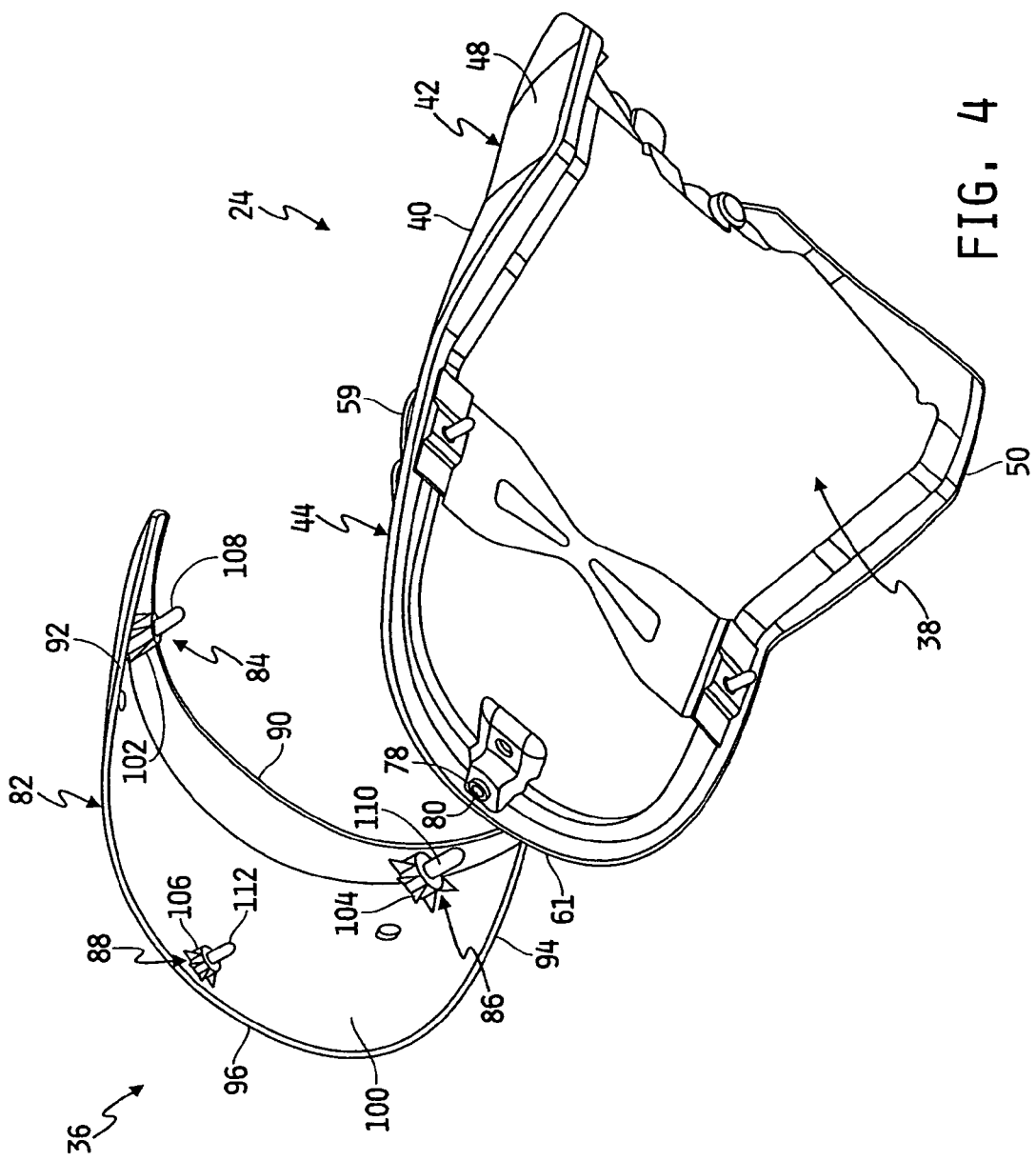

Referring now to FIGS. 2 through 4, seat 24 and seat cowl 36 are shown removed from vehicle 10. Seat 24 includes a base plate 38 (FIG. 4), padding such as foam or gel (not shown), and covering 40. Seat 24 is configured to form a front platform 42 and a rear platform 44. Front platform 42 includes a nose 46, side surfaces 48, 50, a lower surface 52, and a rear surface 54. Rear platform 44 includes an upper surface 56, a downwardly curving peripheral surface 58, and a passenger strap 59 attached to rear platform 44 using conventional techniques. Rear platform 44 is separated from front platform 42 by a transition or rise 60 and terminates at rear end 61.

A plurality of recesses 62, 64, 66 are formed in rear platform 44. While three recesses 62, 64, 66 are shown in the figures, it should be understood that more or fewer recesses may be used consistent with the teachings of the present invention. Recesses 62, 64 are formed adjacent rise 60 into peripheral surface 58. Recess 62 includes a side wall 68 and a lower wall 70, which includes an opening (not shown) that receives a grommet 72. Grommet 72 is secured within the recess opening using any of a variety of conventional methods, and includes a bore 74 configured to receive a portion of seat cowl 36 as is further described below. Similarly, recess 64 includes a side wall and a lower wall having an opening that receives a grommet (none shown). Recess 66 is formed adjacent rear end 61 of rear platform 44 in peripheral surface 58. Recess 66 similarly includes a side wall (not shown) and a lower wall 76, which includes an opening (not shown) that receives a grommet 78. Grommet 78 also includes a bore 80.

Seat cowl 36 includes a curved body 82 and a plurality of fasteners 84, 86, 88. Body 82 includes a forward edge 90, side edges 92, 94, rearward edge 96, an upper surface 98 and a lower surface 100. Seat cowl 36 is depicted as forming a substantially continuous surface with rear fender 22 when seat cowl 36 is coupled to seat 24. It should be understood, however, that seat cowl 36 may be formed in any of a variety different shapes depending upon the styling decisions of the manufacturer. As best shown in FIG. 4, each of fasteners 84, 86, 88 includes a base 102, 104, 106 and a substantially cylindrical prong 108, 110, 112. Bases 102, 104, 106 and prongs 108, 110, 112 are shown as being formed as integral assemblies with body 82. It should be understood, however, that prongs 108, 110, 112 may be removable from bases 102, 104, 106, and/or bases 102, 104, 106 may be removable from lower surface 100 of body 82. As should be apparent from the figures, fasteners 84, 86, 88 are spaced on lower surface 100 in corresponding relationship with recesses 62, 64, 66 of seat 24. More specifically, fasteners 84, 86, 88 are located such that prongs 108, 110, 112 enter corresponding grommet bores (only bores 74 and 80 are shown), and secure seat cowl 36 to seat 24 as a result of a friction fit between the prongs and the grommets. Accordingly, no tools are needed to install or remove seat cowl 36. When in this first position (as shown in FIG. 2), seat cowl 36 covers substantially all of rear platform 44 of seat 24.

When the owner of vehicle 10 decides to carry a passenger or simply change the look of vehicle 10, the owner may remove seat cowl 36 from seat 24 to expose rear platform 44. Unlike conventional removable seat cowls, the owner need not carry or find a temporary storage location for the removed seat cowl 36. Instead, the owner may couple seat cowl 36 to another location on vehicle 10. Any of a variety of other locations may be used if configured according to the principles of the present invention. In one embodiment, the other location is on a front surface of windshield 34 as described below.

Figure 5:
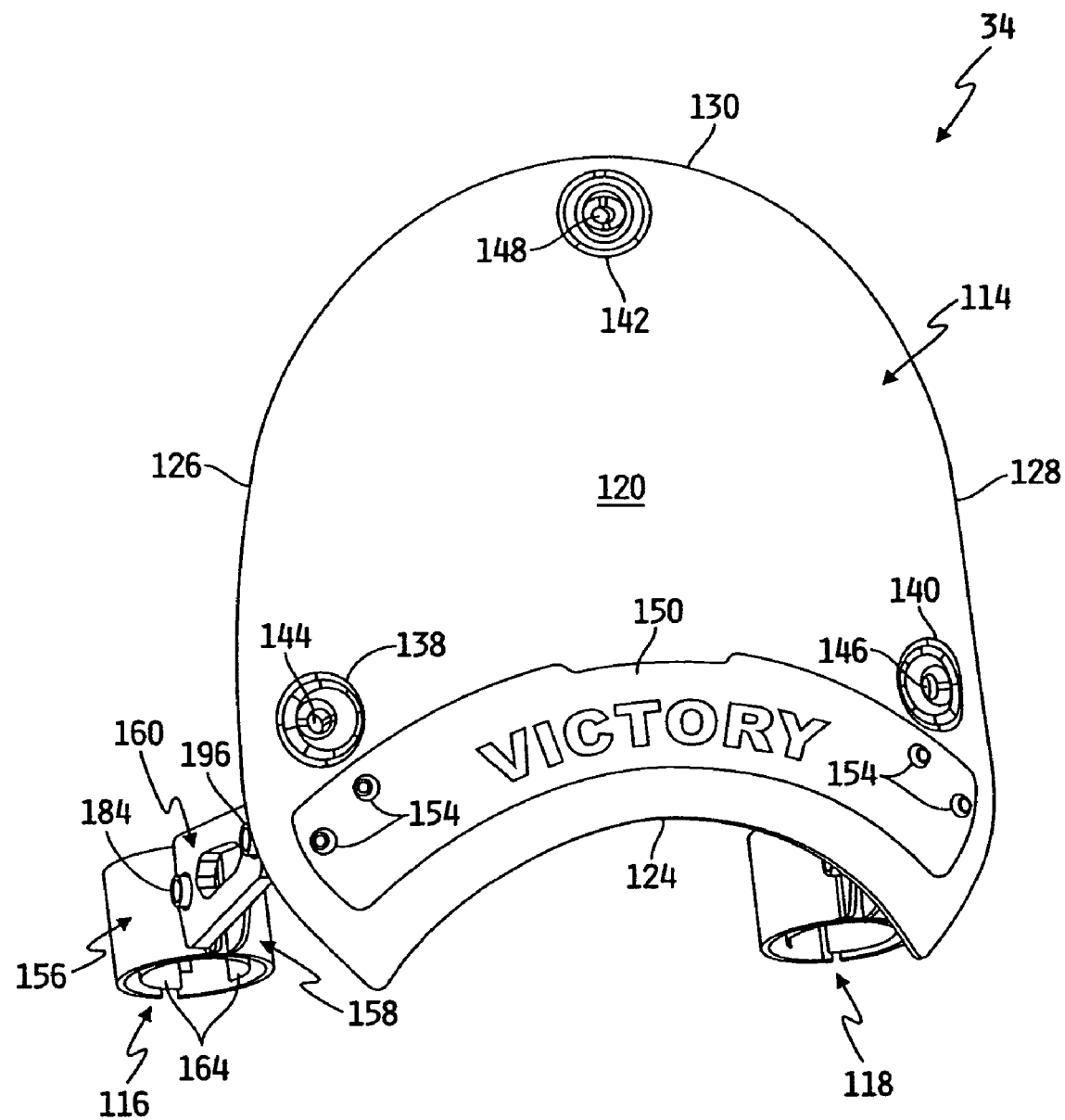
FIG. 5 is a perspective view of a windshield configured for use with the seat cowl of FIGS. 1 through 4.
Figure 6:
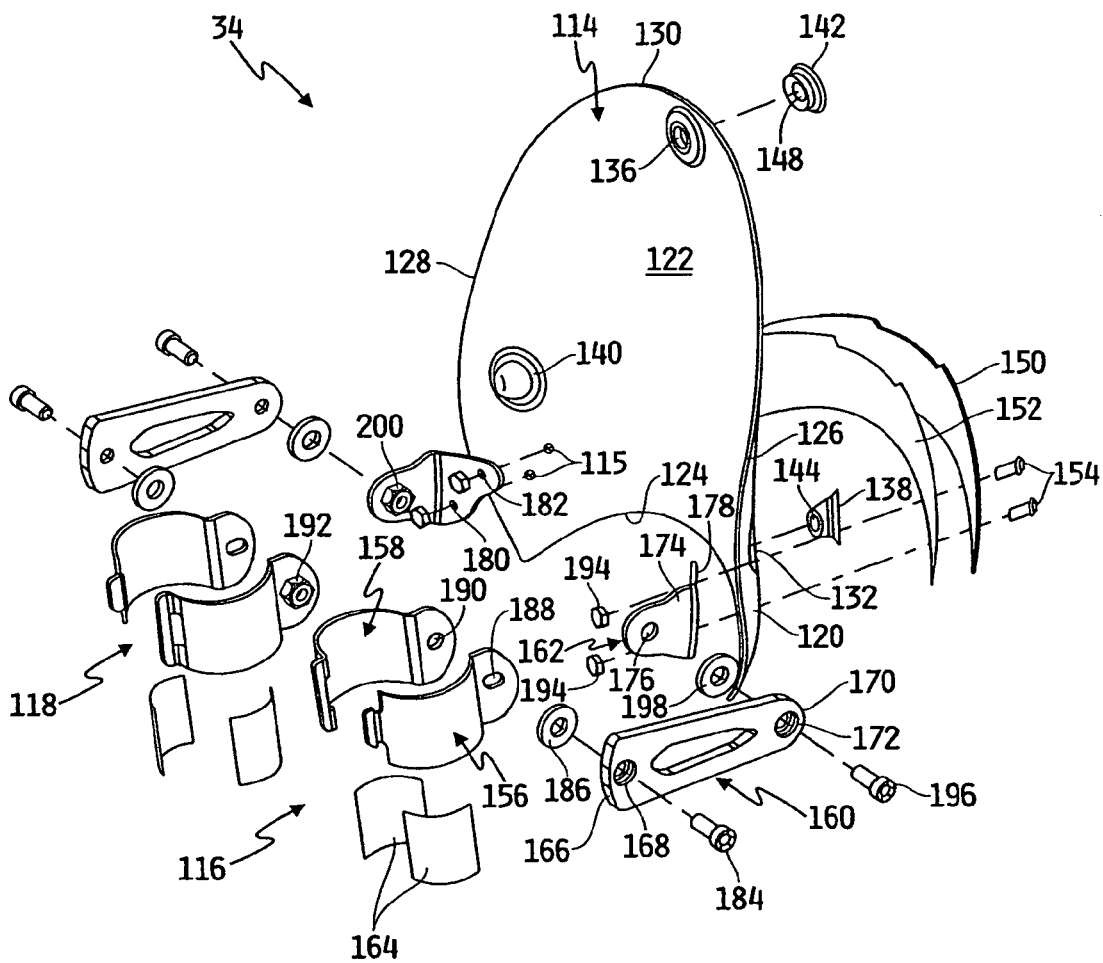
FIG. 6 is an exploded perspective view of the windshield of FIG. 5.

Referring to FIGS. 5 and 6, windshield 34 generally includes a screen 114 and mounting brackets 116, 118. Screen 114 includes a front surface 120, a rear surface 122, a lower edge 124, side edges 126, 128, and an upper edge 130. A pair of openings 132 (only one is shown in FIG. 6) extend through screen 114 adjacent lower edge 124. A third opening 136 extends through screen 114 adjacent upper edge 130. Openings 132, 136 are sized to receive respective grommets 138, 140, 142. Each grommet 138, 140, 142 includes a bore 144, 146, 148. As should be apparent from the foregoing, grommets 138, 140, 142 are spaced and located on screen 114 to correspond with the spacing of fasteners 84, 86, 88 of seat cowl 36. Additionally, bores 144, 146, 148 are oriented within grommets 138, 140, 142 to receive respective prongs 108, 110, 112 of fasteners 84, 86, 88. Screen 114 may also include a name plate 150 and gasket 152 configured to attach to screen 114 at openings 115 using conventional fasteners 154.

Mounting brackets 116, 118 are substantially mirror images of one another. Accordingly, only one mount is described herein. Mounting bracket 116 generally includes interlocking upright mounts 156, 158 configured to attach to upright 28 of handlebars 26, an intermediate bracket 160, and a windshield bracket 162. Pads 164 are provided for upright mounts 156, 158 to prevent damage to uprights 28. Intermediate bracket 160 includes a first end 166 having an opening 168 and a second end 170 having an opening 172. Windshield bracket 162 includes a first portion 174 having an opening 176 and a second portion 178 having a pair of openings 180, 182. Second portion 178 is curved to correspond to the contour of rear surface 122 of screen 114.

Windshield 34 is coupled to handlebars 26 by affixing pads 164 to the interior surfaces of upright mounts 156, 158. Upright mounts 156, 158 for each mounting bracket 116, 118 are interlocked, and positioned on respective uprights 28, 30. Bolts 184 are placed through openings 168 of intermediate brackets 160, washers 186, openings 188, 190 of upright mounts 156, 158, respectively, and threaded into nuts 192 attached to upright mounts 158. Windshield brackets 162 are attached to screen 114 by placing windshield brackets 162 onto rear surface 122 of screen 114 such that fasteners 154 extend through openings 180, 182. Then, nuts 194 are threaded onto fasteners 154. Finally, bolts 196 are placed through openings 172 of intermediate brackets 160, washers 198, openings 176 of windshield brackets 162, and threaded into nuts 200 attached to windshield brackets 162.

When seat cowl 36 is removed from its first location, it may be attached to front surface 120 of windshield 34 by aligning fasteners 84, 86, 88 with grommets 138, 140, 142, respectively, such that prongs 108, 110, 112 enter grommet bores 144, 146, 148. The friction fit between the parts secures seat cowl 36 to windshield 34. When in this second position, seat cowl 36 substantially covers front surface 120 of windshield 34.

It should be understood that while fasteners 84, 86, 88 of seat cowl 36 have been described as including prongs 108, 110, 112 that are received by grommet bores, the present invention may also be implemented by using prongs at the seat cowl 36 mounting locations (i.e., the first position and the second position) and grommets or other female components on seat cowl 36. Moreover, many of a plurality of alternative fastening devices may be employed such as hook and loop fasteners, spring biased clips, magnets, screws, or nuts and bolts.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A removable vehicle component, including:
a body configured to couple to a vehicle in a first position wherein the body covers a portion of a seat of the vehicle, and the body being removable from the first position on the vehicle and being configured to couple to a second position on the vehicle wherein, when in the second position, the body does not cover the portion of the seat, and the portion of the seat is accessed for use.

2. The component of claim 1 wherein the portion of the seat is a rear platform configured to receive a passenger of the vehicle.

3. The component of claim 1 wherein the body includes a plurality of fasteners to couple the body to the vehicle.

4. The component of claim 3 wherein the fasteners extend from a lower surface of the body.

5. The component of claim 3 wherein each of the fasteners includes a substantially cylindrical prong that is received by one of a plurality of corresponding bores formed in the vehicle.

6. The component of claim 1 wherein the second position is adjacent a front surface of a windshield of the vehicle.

7. The component of claim 1 wherein the body forms a seat cowl that substantially conforms to contours of a rear fender of the vehicle when the body is in the first position.

* * * * *